No. 761,900.  
Patented June 7, 1904.

UNITED STATES PATENT OFFICE.

NEWTON JEFFERSON NORMAN, OF JACKSONVILLE, FLORIDA.

FLUX COMPOUND.

SPECIFICATION forming part of Letters Patent No. 761,900, dated June 7, 1904.

Application filed March 5, 1904. Serial No. 196,668. (No specimens.)

*To all whom it may concern:*

Be it known that I, NEWTON JEFFERSON NORMAN, a citizen of the United States, residing at Jacksonville, in the county of Duval and State of Florida, have invented a new and useful Flux Compound, of which the following is a specification.

This invention relates to a flux or compound for welding copper, iron, steel, and other metals, and has for its object to provide an improved flux of this character by means of which two pieces of copper may be welded together, so as to produce a perfect union between the surfaces in contact.

With this object in view the invention consists in a compound or flux formed of the following ingredients in the proportions stated: sal-ammoniac, four parts; saltpeter, three parts; sal-soda, three parts; yellow prussiate potash, four parts; borax, five parts, and pulverized glass three parts.

The above ingredients are first pulverized in any suitable manner and then thoroughly mixed together in a vessel or other suitable receptacle, so that the several parts will be well blended.

In carrying my invention into effect the two ends or surfaces of the copper to be united are preferably chamfered to form a lap or scarf joint and then thoroughly cleaned and heated to the proper point for welding. The above flux or compound is then sprinkled on the heated ends of the copper, which causes the latter to become sticky, and while the copper is in this condition the adjacent ends thereof are subjected to external pressure, as by hammering, rolling, or the like, thereby effecting a perfect union or weld between the parts.

While I have described the flux as being particularly adapted for use in welding copper, it is obvious that the same may be used with equally good results in uniting iron and steel or for welding similar and dissimilar metals.

It will be understood that I do not limit myself to the exact proportions of the different ingredients herein specified, as they may be varied as desired without departing from the spirit of the invention.

Having thus described the invention, what is claimed is—

1. The herein-described welding-flux the same consisting of the following ingredients: sal-ammoniac; saltpeter; sal-soda; yellow prussiate potash; borax and pulverized glass.

2. The herein-described welding-flux the same consisting of the following ingredients in the proportions specified: sal-ammoniac four parts; saltpeter three parts; sal-soda three parts; yellow prussiate potash four parts; borax five parts and pulverized glass three parts.

In testimony that I claim the foregoing as my own I have hereto affixed my signature in the presence of two witnesses.

NEWTON JEFFERSON NORMAN.

Witnesses:
H. J. CASSIDY,
E. J. CANDEF.